April 27, 1965   Q. W. GOW ETAL   3,180,923
UNITARY MULTIPLE PASSAGE JUNCTION FITTING FOR CABLE
ASSEMBLIES AND METHOD OF MAKING SAME
Filed Jan. 3, 1961   2 Sheets-Sheet 1
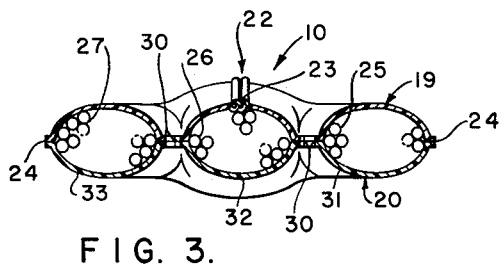
FIG. 3.
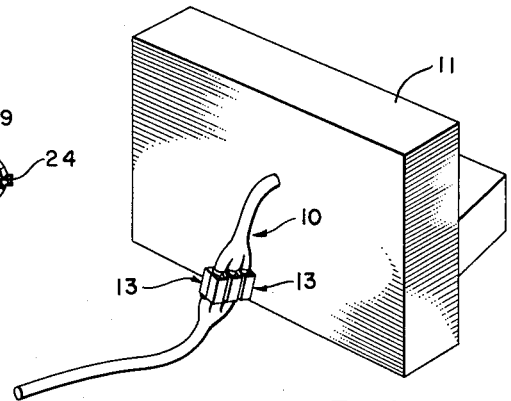
FIG. 1.
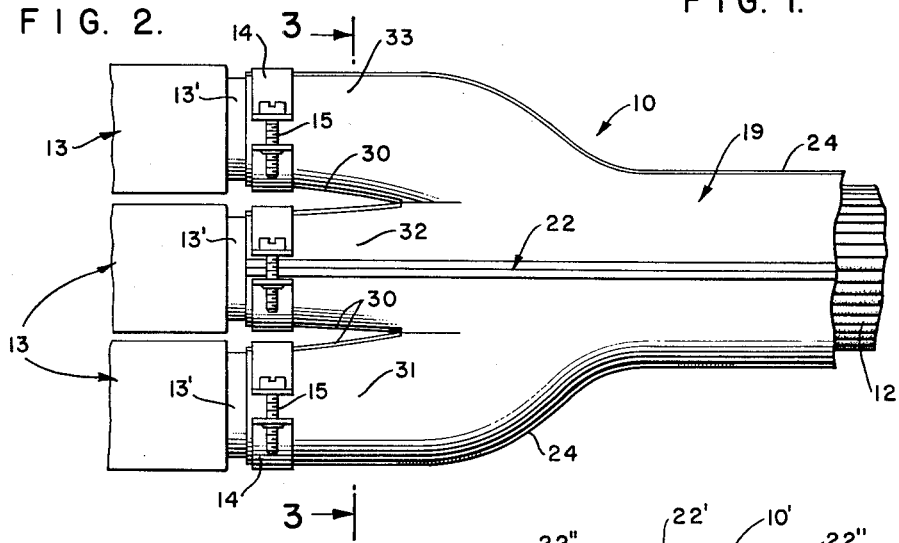
FIG. 2.
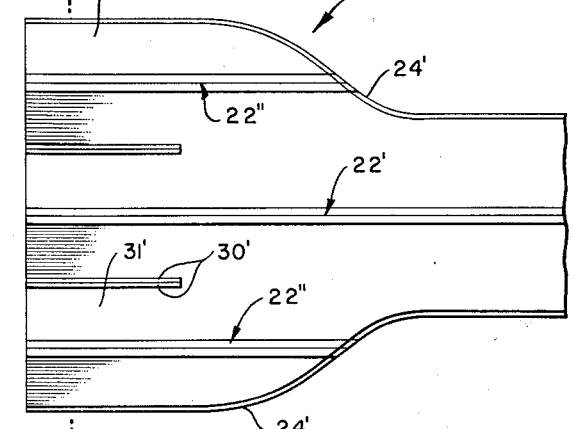
FIG. 5.
FIG. 4.
QUINN W. GOW
HUGH R. EDWARDS
*INVENTORS*
BY 
ATTORNEY April 27, 1965  Q. W. GOW ETAL  3,180,923
UNITARY MULTIPLE PASSAGE JUNCTION FITTING FOR CABLE
ASSEMBLIES AND METHOD OF MAKING SAME
Filed Jan. 3, 1961  2 Sheets-Sheet 2
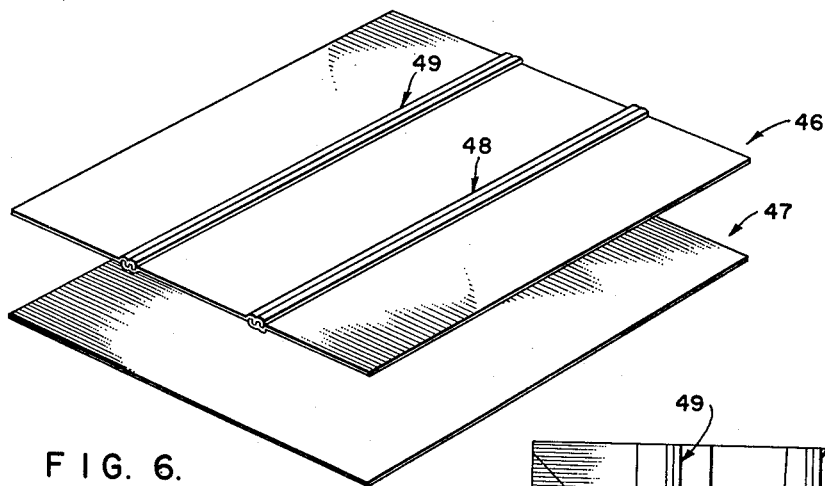
FIG. 6.
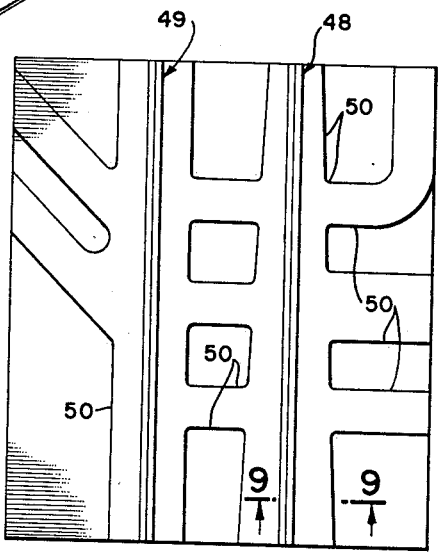
FIG. 7.
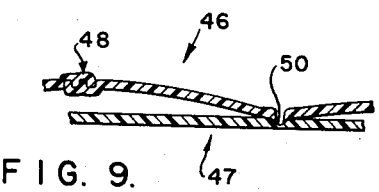
FIG. 9.
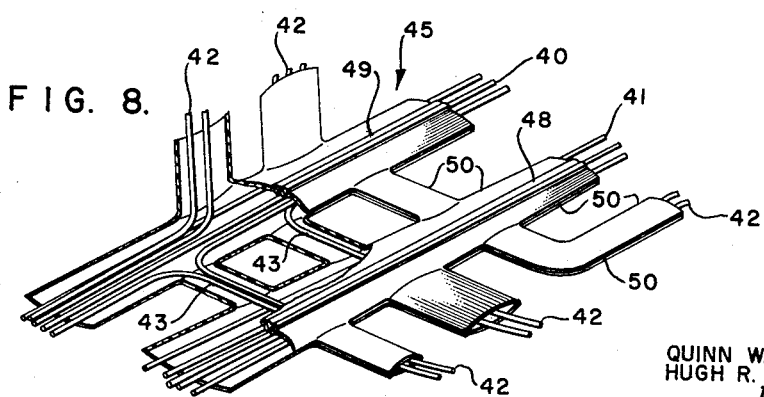
FIG. 8.
QUINN W. GOW
HUGH R. EDWARDS
INVENTORS
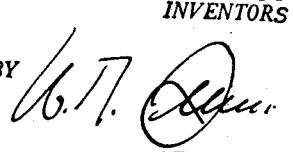
ATTORNEY United States Patent Office 3,180,923
Patented Apr. 27, 1965

3,180,923
UNITARY MULTIPLE PASSAGE JUNCTION FITTING FOR CABLE ASSEMBLIES AND METHOD OF MAKING SAME
Quinn W. Gow, Downey, and Hugh Robert Edwards, Corona del Mar, Calif., assignors to Walter A. Plummer, Sherman Oaks, Calif.
Filed Jan. 3, 1961, Ser. No. 80,147
9 Claims. (Cl. 174—72)

This invention relates to cable harness devices and more particularly to a multiple passage junction fitting of unitary construction useful in providing a fluid-tight, neat appearing, easily assembled enclosure particularly suitable for encasing portions of cable assemblies having branchouts.

The present invention is related to the tubular junction assemblies forming the subject matter of the co-pending application of Walter A. Plummer, Serial No. 746,696, filed July 7, 1958 now abandoned, for Tubular Junction Fittings, and represents certain improvements over the constructions there disclosed.

Cabling assemblies are used in large quantities to interconnect various subassemblies of electrical and electronic equipment. These cable assemblies are oftentimes custom constructed at the point of equipment installation, and are frequently of highly complex construction involving intricate branchouts and cross-over connections between two or more main trunks. Formerly it was the practice to employ special lacings and wrappings applied by hand at spaced intervals to hold the individual wires of different cable sections and branchouts compacted together and subdivided appropriately to meet the individual requirements of equipment being served.

More recently, the practice has been adopted of enclosing the cabling in protective tubular covers desirably having reclosable access seams by which changes in the cabling can be made and through which access may be had for the servicing and inspection of the cabling. However, troublesome problems have been encountered in the provision of jacketing meeting the requirements of a suitable jacket accommodating branchouts from the main cable trunk. The problem is particularly aggravating in more complex branchout arrangements and where the branchouts are closely spaced to one another.

To meet these needs it has been proposed to provide straight sections of tubular jacketing having longitudinal seam means which can be separated and reclosed. The individual sections of the cabling are then fitted with such jacketing of appropriate length. However, no satisfactory means has been available for forming a neat and satisfactory junction of one branch with another branch of the cable system. This problem has been solved in part by the junction fitting construction disclosed in the above referred to co-pending application.

The present invention and the principles thereof represent important departures form the principles of the earlier filed application. For example, the present construction is fabricated essentially from two substantially flat sheet-like subassemblies of flexible insulating material. These are superimposed in direct surface contact with one another whereupon their facing surfaces are securely bonded together along spaced lines having a configuration conforming with the shape of a cable junction desired to be enclosed by the finished product. One of the sheet assemblies is preconstructed with separable seam means, preferably of the slide fastener type, with the seam extending parallel to the axis of at least one of the passages of the completed fitting.

After the two sheets have been bonded together in the particular pattern desired, all excess portions exteriorly of the bonded areas are trimmed away thereby forming a multiple-passage compactly flattened junction fitting of the particular contour required for a given cabling system and initially having the appearance illustrated in FIGURES 4 and 5. This technique lends itself to the convenient and speedy formation of junction fittings meeting equally satisfactorily the requirements of both simple and very complex configurations. Furthermore, the technique is especially adapted for the custom construction of a single or a large number of identical fittings each individually tailored to the needs of a particular custom cable assembly. By the proper design of the two face sheets employed in constructing each junction fitting assembly, as many or as few seams as desired may be provided for convenient access to the interior of the tubular passages. In all cases the resulting product comprises a compactly flattened unitary fitting of thin flexible material each passage of which is individually formed, shaped and positioned as desired relative to the other passages.

Accordingly, it is a primary object of the present invention to provide a simple, improved method and article of manufacture in the form of a customized junction fitting for use in enclosing and protecting cable systems of both simple and complex design.

Another object of the invention is the provision of a technique for the expeditious and economical construction of a customized junction fitting in the nature of a tailored harness for cabling having branchouts, special configurations, and with portions thereof offset from other portions.

Another object of the invention is the provision of a compactly flattened tailored junction fitting having a readily openable and closable integral seam means providing access to one or more tubular passageways of the fitting.

Another object of the invention is the provision of fluid-tight cable harness formed of thin flexible impervious material and provided with unitary multiple branchouts all opening into one or more trunk passages and having separable seam means facilitating the assembly of the harness to a cable.

These and other more specific objects will appear upon reading the following specification and claims and upon considering in connection therewith the attached drawings to which they relate.

Referring now to the drawings in which preferred embodiments of the invention are illustrated.

FIGURE 1 is a fragmentary view in perspective of a telephone switchboard or other electrical equipment having readily connectable and disconnectable terminal fittings for a supply cable featuring a unitary dust and fluid-tight harness according to the present invention;

FIGURE 2 is a fragmentary enlarged view of one terminal end of the cabling shown in FIGURE 1;

FIGURE 3 is a transverse sectional view taken along line 3—3 on FIGURE 2;

FIGURE 4 is a plan view of a second preferred embodiment of the jacketing suitable for use on the cable terminal shown in FIGURES 1 to 3;

FIGURE 5 is a transverse sectional view on slightly reduced scale taken along line 5—5 on FIGURE 4;

FIGURE 6 is an exploded view in perspective of a pair of sheet sub-assemblies in readiness to be bonded together to form a junction fitting;

FIGURE 7 is a top plan view of FIGURE 6 after the two sub-assemblies have been bonded together along the lines indicated in that figure;

FIGURE 8 is a perspective view of the junction fitting shown in FIGURE 7 after the surplus material has been trimmed away, portions of the jacket being broken away to show the arrangement of the cabling wires in the assembled condition of the fitting; and FIGURE 9 is a fragmentary view on an enlarged scale taken along line 9—9 on FIGURE 7 showing details of one mode of bonding the two sheets together.

Referring first to FIGURES 1, 2 and 3 there is shown one preferred embodiment of the invention designated generally 10 and assembled to a multiplicity of wires 12 entering the rear of telephone switchboard 11. To facilitate installation of switchboard 11, cabling 12 is severed and its adjacent ends are subdivided into three substantially equal groups of wires 25, 26, 27 (FIGURE 3) for convenience in connecting them to the usual pins and receptacles therefor of the separable connector blocks 13. The latter are of conventional construction each separable into two parts along planes parallel to the cable axis with the one part having pins mounted therein and soldered to the wires of one cable and the other half having sockets for seating the pins and soldered to the terminal ends of the other cable wires. One section of each terminal block 13 includes a clamping band 14 at each end provided with a clamping screw 15 by which the terminal fitting covers can be held in assembled position and serving additionally to hold one of the associated tubular ends of jacketing 10 snugly clamped to terminal block 13.

Junction fitting 10 including its three terminal branches is best shown in FIGURES 2 and 3. It is pointed out that this unitary fitting is formed from two sheet like sub-assemblies 19 and 20 of suitable thin flexible non-metallic impervious material such as an elastomer or a suitable thermoplastic material, as for example, polyvinyl chloride or polyethylene. As shown, sheet 19 is provided with a separable seam 22 extending centrally lengthwise thereof and by means of which access may be had to the interior of fitting 10 during the assembly of the fitting to the cable and as necessary for servicing at any future date. Seam 22 may be of any suitable inter-engaging configuration but typically includes complementally shaped interfitting tongues and grooves 23 extending lengthwise of its free edge and molded or otherwise formed in the material 19. These tongues and grooves are interengageable with one another to form a snug high-strength fluid-tight seam.

Sheets 19 and 20 are placed in fluid contact with one another and heat sealed or otherwise snugly bonded together along their outer peripheral edges 24 to provide compactly flattened tubular passages of the appropriate size snugly to enclose the closely compacted wires of cabling 12. As here shown, the separable ends of cabling 12 is to be subdivided into three smaller groups of wires 25, 26 and 27 (FIGURE 3). In order that fitting 10 may enclose each of these sub-groups of wires, sheets 19 and 20 are heat sealed together along the V-shaped lines 30, 30 (FIGURE 2), whereupon this bonded area is slit centrally lengthwise thereof to separate the fitting into relatively small diameter tubular branchouts 31, 32, 33.

The described fitting 10 is applied about the grouped terminal ends of cabling 12 by opening seam 22 and placing the main body of the fitting about the main body of the cable from one side thereof. Terminal group 25 is then inserted into the inner end of fitting passage 31, group 26 is placed in central passage 32 and the third group of wires 27 is inserted through fitting passage 33. Seam 22 is then closed toward its branch end. At this time the two halves of the detachable terminal blocks 13, 13, are disassembled and the ends of the wires must be attached to the terminal tips of each of these blocks. Once this has been accomplished and the halves of blocks 13 are pressed together, tubular branchouts 31, 32 and 33 of the junction fittings can be telescoped over the tubular inlets 13' for the wires, following which the clamping screws 15 of the several clamps 14 are tightened to secure the parts rigidly together.

Referring now to FIGURES 4 and 5 there is shown another preferred construction of the junction fitting designated generally 10'. It will be understood that this fitting is fabricated in substantially the same manner described above in connection with FIGURES 1 to 3 and differs only in that tubular branchouts 31', 33' are each provided lengthwise thereof with independent separable seams 22'' identical with seam 22' and with separable seam 22 in the first described embodiment. As here shown, seams 22'' are parallel with seam 22' and extend lengthwise centrally of the respective branchouts 31', 33'. The right-hand ends of seams 22'' merge with and are sealed to marginal bonds 24' of the fitting. Accordingly, it will be understood that these latter ends of seams 22' are sealed closed, all remaining portions of these seams being fully openable in the usual manner. Seam 22' extends the full length of the fitting and permits the fitting to be assembled about the cabling laterally from one side thereof. The presence of seams 22'' permits freer and more convenient access to the groups of wires 25 and 27. As is true of branchout groups of wires 31 and 33 of the first described embodiment, the wires housed within tubular passages 31 and 33 as well as in passages 31' and 33' must be fed into these passages at the junction of these passages with the main passage.

Referring now to FIGURES 6 through 9, other embodiments of the invention illustrative of the many complex forms easily fabricated using the techniques of this invention will be described. Let it be assumed that there is need for a junction of the rather intricate configuration shown in FIGURE 8 featuring two parallel main trunks 40, 41 generally parallel to one another, as well as lateral branchouts 42 from both trunks as well as cross-overs 43 interconnecting the two trunks at different points therealong.

To construct a unitary junction fitting to enclose this complex cabling arrangement, two sheet-like sub-assemblies 46, 47 of identical size are prepared from suitable flexible non-metallic material such as thermoplastic. Upper sub-assembly 46 is shown as formed with a pair of slide fastener seams 48, 49 extending generally parallel to one another for the full length of the sub-assembly, these being of the same type referred to above in connection with FIGURES 1 to 4. The two sheets are superimposed directly upon one another and are bonded together as by an adhesive or preferably by heat fusion along the lines indicated at 50 in FIGURE 7. The bonding is desirably carried out under heat and pressure with a roller or an elongated heated platen. In forming this bond, the upper sheet assembly is preferably deeply grooved, as is best shown in FIGURE 9, the marginal edges of each bonding groove being fused together to provide a high strength seam 50 holding the two sheets together. The deep grooves provide a convenient guide for trimming away the flashing or excess material to provide the finished junction fitting assembly 45 illustrated in FIGURE 8. Of interest is the fact that a trunk passage having several branchouts desirably decreases in cross-sectional area along its length. This is readily accomplished by tapering the passage formed to enclose such a trunk in the manner illustrated in FIGURES 7 and 8.

The tubular passages provided for the branchouts may be of any desired length simply by utilizing sheet subassemblies 46 and 47 of the requisite size. Also it will be readily apparent that the branchouts may be of any desired relative size, shape and configuration.

As initially constructed, junction fitting 45, like those described in FIGURES 1 to 5, are substantially flat and tend to remain so until placed about wiring to enclose the same. In fact, unless the passages are filled with wires, the fitting continues its tendency to remain as flat as is permitted by its contents.

Fitting 45 is assembled about the cabling for which it has been tailored in the same manner explained above. It will be apparent that the wires extending into branchouts 42 or cross-overs 43 must be inserted endwise through these passageways. This operation is readily accomplished once the separable seams 48 and 49 have been laid open and the wires of the main trunks 40 and 41 have been inserted in the two parallel passageways of the fitting. Thereafter wiring having portions located in the branchout and cross-over passages are inserted through the appropriate passages. Once all wires have been inserted in the proper positions and checked for accuracy seams 48 and 49 are closed.

If it is desired that the assembly be a permanent one, a suitable solvent or adhesive is applied to the mating grooves of the seams immediately prior to the closure of the seam. Usually, however, it is desired to leave the seams unsealed in order that these may be reopened and reclosed from time to time as required for inspection and servicing of the cabling.

It will be understood that portions of the cabling system beyond the terminal ends of the various passages of fitting 45 are preferably enclosed by straight tubular lengths of jacketing fabricated from the same material as fitting 45, such lengths of tubing preferably being sufficiently long as to overlap and form a snug lap joint with the branchout portions of fitting 45. Such overlapping not only provides a snug and neat fit but assures complete enclosure or harness for all portions of the wiring.

In view of the foregoing it will be appreciated that the junction fitting of this invention is extremely versatile and that the fabricating principle lends itself to endless variations to meet the size and shape requirements of widely differing applications. Although the separable seams have been shown as restricted to a single face of sub-assemblies 46 and 47 it will be understood that the seams can be applied to both and that the seams for one sub-assembly may provide access to the main trunk of the cable whereas those formed in the other sub-assembly may be arranged to provide access to the branchout and cross-over passages.

While the particular junction fitting herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. The method of fabricating a flat unitary tubular wire harness for enclosing cabling having branchouts therealong, said method comprising forming a pair of subassemblies from thin flexible sheet thermoplastic material, and one of said subassemblies including a plurality of parts held separably joined together lengthwise thereof by interlocking tongue and groove seam means carried by the adjacent lateral edges of said parts, laying said two subassemblies flush against one another, heat fusing said subassemblies together along narrow bands along pairs of parallel lines to form at least three tubular passages all of which are in open communication interiorly of said wire harness and all of which have unrestricted outer ends through which the ends of separate groups of cable wires are adapted to extend when said harness is assembled about cabling with branchouts, and removing the flashing along the sides of said tubular passages and outwardly of the outer edges of said narrow bands of heat-fused thermoplastic material to provide the completed wire harness.

2. The method of fabricating a unitary tubular flattened wire harness adapted to enclose cabling having branchouts therealong thereby to provide a continuous protective covering for cabling free of joints at the junctions of branchouts and adjacent portions of said tubular harness, said method comprising forming a pair of elongated subassemblies from flexible sheet thermoplastic material at least one of which subassemblies has a plurality of parts provided along the adjacent lateral edges thereof with tongue and groove means which separably interlock to form a seam extending lengthwise from end-to-end of said one elongated subassembly, placing the interlocked parts of said one subassembly flush against the other subassembly, heat fusing said subassemblies together along narrow bands lying generally parallel to one another to form at least three tubular passages all in open communication with one another between the opposite ends of said cabling harness and at least three of which open through the opposite ends of said fused together subassemblies, all of said tubular passages being free of restrictions and obstructions throughout the lengths thereof and at least one of which tubular passages has a seam of interlocking tongue and groove extending from end-to-end of said harness, and removing the flashing and excess material exteriorly of the narrow bands of heat fusing along the opposite lateral edges of said tubular passages.

3. The method defined in claim 2 characterized in that said heat fusing step includes as a part thereof the step of substantially cutting through both of said subassemblies immediately beside the edge of said narrow bands along the side outwardly from the tubular passage being formed by said narrow band thereby to facilitate the removal of excess material at the end of the heat fusing operation.

4. The method defined in claim 3 characterized in the step of forming a plurality of the tubular passages of said harness with individual separable seams of interlocking tongues and grooves to facilitate the assembly of said harness about branched cabling.

5. The method defined in claim 2 characterized in the step of forming said unitary harness with at least a pair of main trunk passages for wires extending from end-to-end thereof and with at least a pair of branchout passages opening laterally from said main trunk passage between the opposite ends thereof.

6. The method defined in claim 2 characterized in the step of forming said harness with at least a pair of tubular passages each having a recloseable seam extending from end-to-end of said harness and a plurality of branchout passages including at least one passage interconnecting said pair of passages and at least one branchout passage opening from the remote lateral edges of said pair of passages.

7. A unitary jacket for use as a cable harness for cabling having branchouts at points therealong and suitable for enclosing said cabling with an impervious continuous jacket, said unitary jacket being formed of flexible sheet thermoplastic material and comprising a tubular main body which lies substantially flat until cabling wires are inserted therealong, said main body including a pair of main sheet subassemblies lying substantially flush against one another as manufactured and formed of thermoplastic material, at least one of subassemblies including interlocking tongue and groove seam means extending from end-to-end of said tubular main body, said pair of subassemblies heat-fused together along narrow lines to form at least three tubular passages in communication with one another intermediate the opposite ends of said seam means, said passages having unrestricted outer ends of substantially the same cross section as their respective inlet portions, said unitary jacket being installable about cabling from the side of the cabling when said seam means is fully opened with one group of wires within the passage having said seam means and other groups of said wires having one end portion of each thereof inserted in and extending through a respective one of the other ones of said jacket passages, and said interlocking tongue and groove means being interengageable to form a closed seam to hold said jacket assembled to enclose and protect the groups of cabling wires.

8. A unitary jacket for use as a cable harness as defined in claim 7 characterized in that the same includes a plurality of passages each provided with separate and independent interlocking tongue and groove seam means extending lengthwise thereof and through which wires can be serviced when the associated one of said seam means is open.

9. A unitary jacket for use as a cable harness as defined in claim 7 characterized in that said jacket includes a plurality of main passages each having branchout passages opening therefrom and each of which is adapted to enclose a group of wires, and being further characterized in that all of said passages are in open communication with one another interiorly of said jacket irrespective of whether said interlocking seam means are in open or closed position.

References Cited by the Examiner
UNITED STATES PATENTS

| | | | |
|---|---|---|---|
| 2,065,524 | 12/36 | Groeniger | 285—150 |
| 2,120,301 | 6/38 | Tishman | 174—72 |
| 2,267,817 | 12/41 | Costa | 154—83 |
| 2,290,166 | 7/42 | Craig et al. | 154—44 |
| 2,388,297 | 11/45 | Slaughter | 154—116 |
| 2,445,624 | 7/48 | McDermott et al. | 154—83 |
| 2,460,622 | 2/49 | Crawley | 285—150 |
| 2,585,054 | 2/52 | Stachura | 174—68 |
| 2,741,499 | 4/56 | Kussmaul | 285—121 |
| 2,756,172 | 7/56 | Kidd | 154—44 |
| 2,941,027 | 6/60 | Svec | 154—44 |
| 2,960,561 | 11/60 | Plummer | 154—44 |
| 3,080,892 | 3/63 | Plummer | 174—72 |

EARL M. BERGERT, *Primary Examiner.*

CARL F. KRAFFT, *Examiner.*